United States Patent [19]

Cousino et al.

[11] 3,879,694

[45] Apr. 22, 1975

[54] SOLENOID DRIVE MECHANISM ACTUATOR WITH ATTACHED MAGNET

[75] Inventors: Bernard A. Cousino; David W. Morgan, both of Fort Myers, Fla.

[73] Assignee: Cousino Corporation, Fort Meyers, Fla.

[22] Filed: Feb. 11, 1974

[21] Appl. No.: 441,327

[52] U.S. Cl. ............................ 335/229; 335/261
[51] Int. Cl. ................................. H01f 7/08
[58] Field of Search .......... 335/229, 254, 255, 259, 335/261, 262, 279

[56] References Cited
UNITED STATES PATENTS

| | | |
|---|---|---|
| 3,022,450 | 2/1962 | Chase, Jr. .................... 335/229 X |
| 3,113,708 | 12/1963 | Moulic, Jr. ..................... 335/261 X |
| 3,396,354 | 8/1968 | Fisher ............................ 335/262 X |

*Primary Examiner*—G. Harris
*Attorney, Agent, or Firm*—Richard D. Emch, Esq.

[57] ABSTRACT

Drive mechanism is provided for moving a storage assembly in either direction. The drive mechanism includes a solenoid and a movable plunger. The plunger pivotally mounts an actuator arm which engages and moves the storage assembly. A magnet is positioned on the actuator arm. The magnet attempts to align itself with the magnetic field of the solenoid. The aligning force swings a drive end of the actuator arm to one side or the other depending on the polarity of the voltage applied to the solenoid.

8 Claims, 7 Drawing Figures

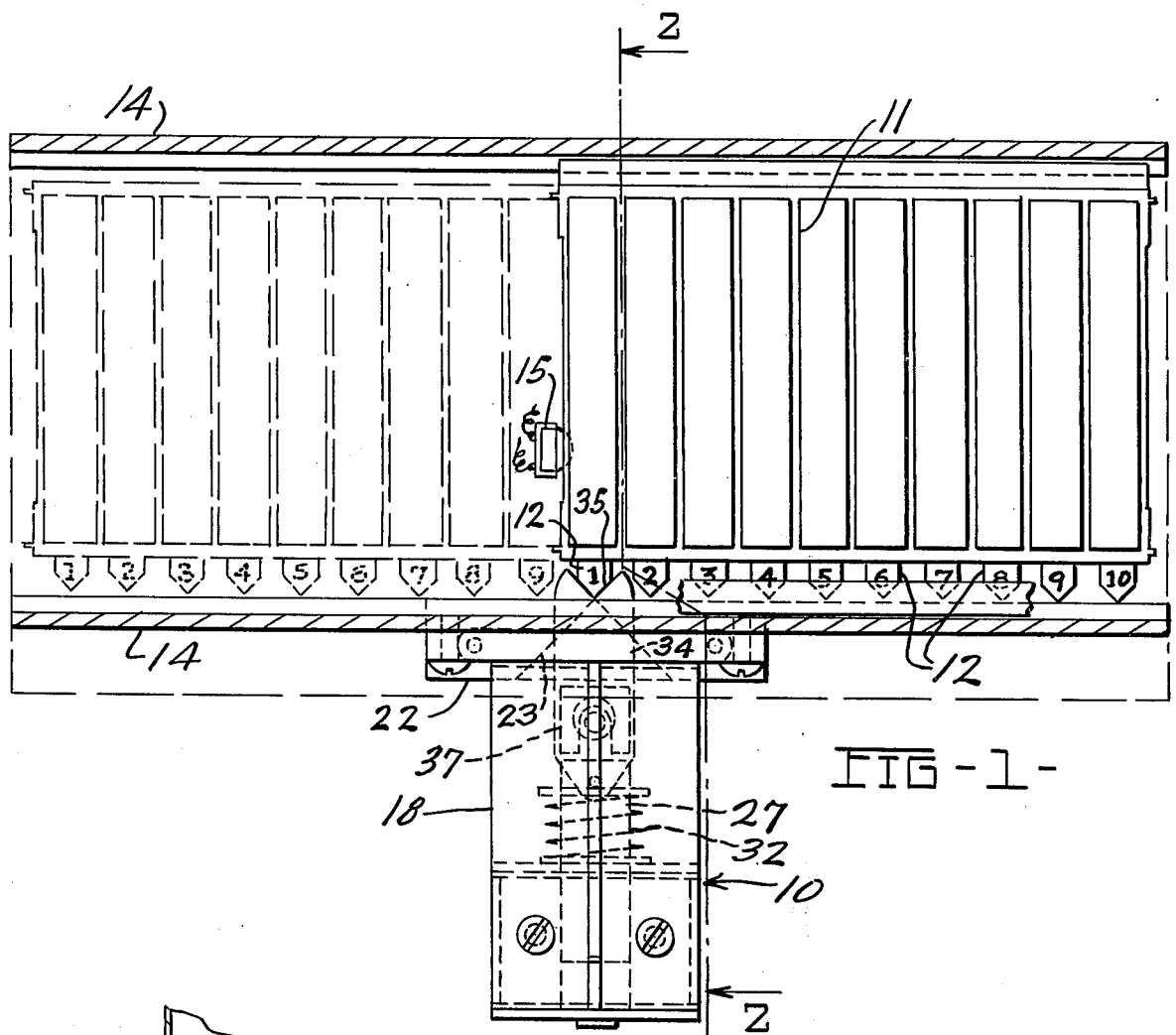
FIG-1-
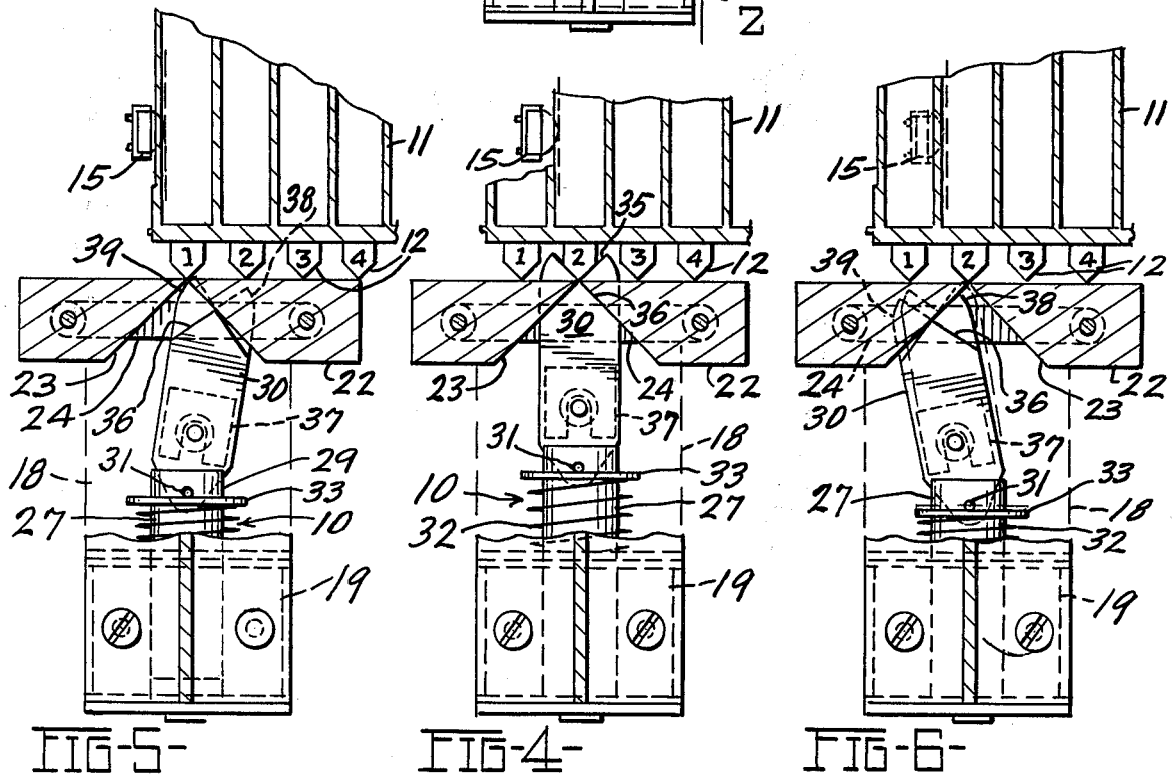
FIG-5- FIG-4- FIG-6-

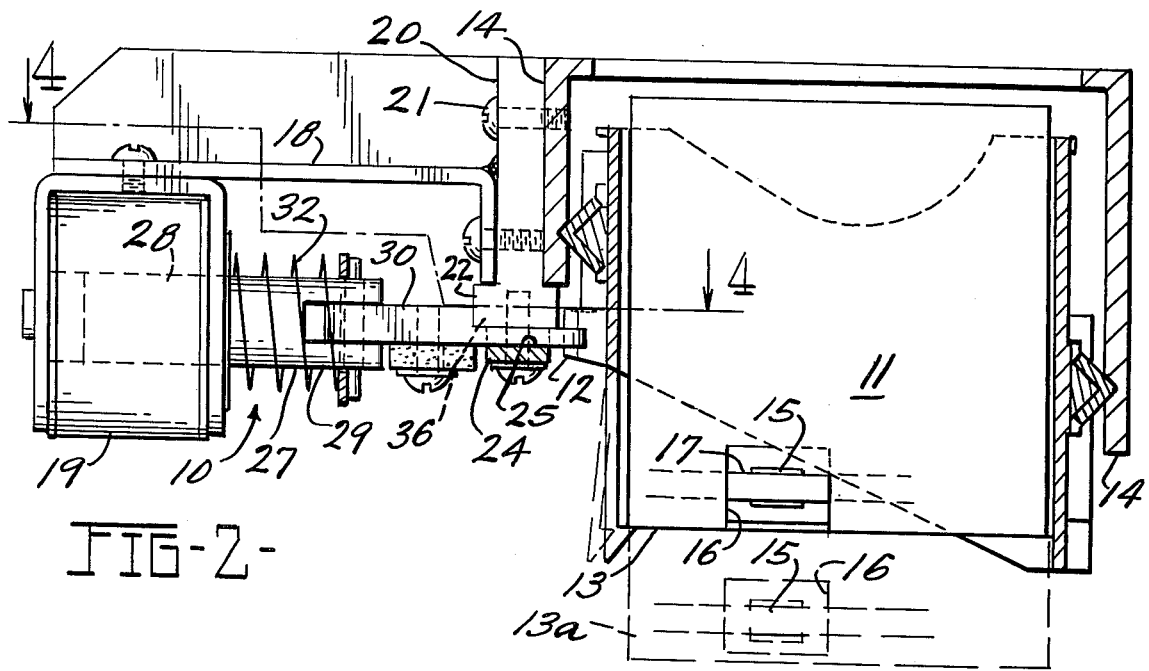
FIG-2-
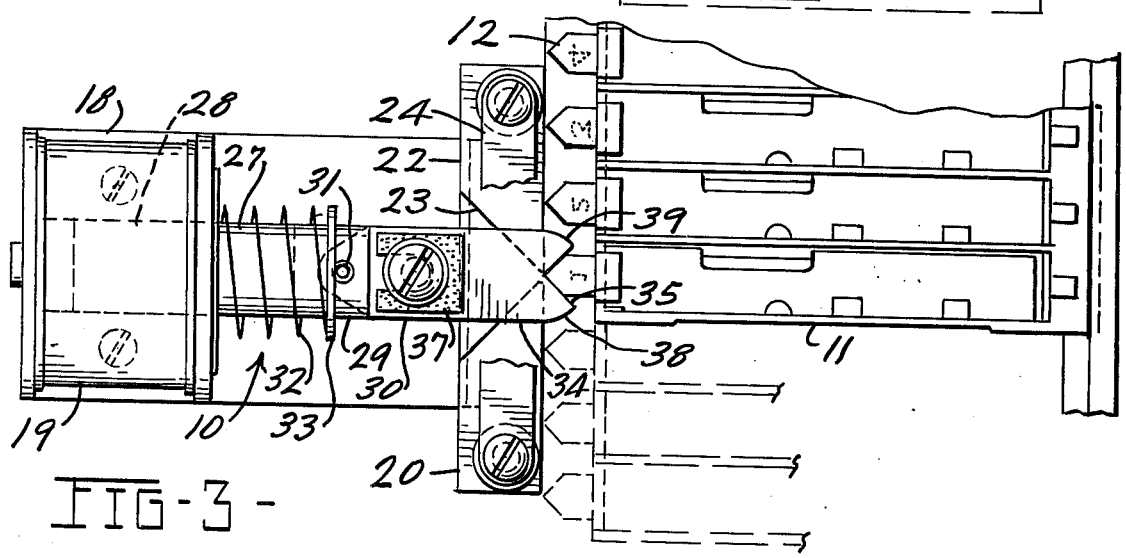
FIG-3-
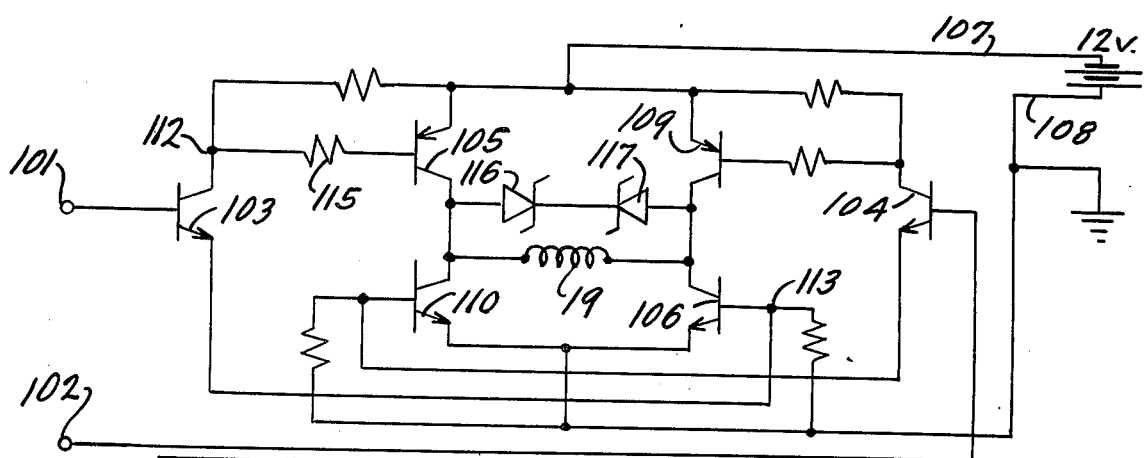
FIG-7-

SOLENOID DRIVE MECHANISM ACTUATOR WITH ATTACHED MAGNET

BACKGROUND OF THE INVENTION

The present invention relates to a drive mechanism for moving a storage rack quickly in either direction to arrive at a selected position and to hold the rack in accurate alignment until the mechanism is again actuated.

Examples of uses of the present drive mechanism would be to align a film transparency over projector handling mechanism of a slide projector. Another use would be with a storage cell assembly, such as the one shown in copending application Ser. No. 414,372, filed Nov. 9, 1973. The drive mechanism in the later example aligns a magnetic tape cartridge over a play/record mechanism so that the cartridge can be operated and returned to its proper storage position.

Prior art drive mechanism included complex mechanical and electrical mechanisms to accomplish the forward and reverse feed action. Often a separate indexing system was utilized in connection with these prior art drive mechanisms.

It is most important that a drive mechanism have the ability to index quickly and accurately both during reverse and forward feed actions.

SUMMARY OF THE INVENTION

The present drive mechanism provides an electromechanical apparatus which is structurally simple but accomplishes both the forward and reverse feeding action, together with an accurate indexing and holding capability.

The present drive mechanism selectively drives a storage assembly having a plurality of spaced drive projections on its outer surface. The storage assembly may be either rectilinear or circular in configuration.

A support member has a perpendicularly aligned actuator support mounted at one end. A guide plate is mounted on the actuator support and includes a V-shaped guide recess. A solenoid is mounted on the support member in spaced relationship to the guide plate. A plunger is received by the solenoid and has an outer end which pivotally mounts an actuator arm having a drive end. The actuator arm is spring biased outwardly and the arm includes a guide member which mates with the guide recess on the guide plate.

A magnet is mounted on the actuator arm. The magnet attempts to align itself with the magnetic field of the solenoid. The aligning force swings the actuator arm to one side or the other depending upon the polarity of the voltage applied to the solenoid. The drive end of the actuator arm engages the spaced projections to feed the storage assembly in either direction and to index and hold the storage assembly in a desired position.

BRIEF DESCRIPTION OF THE DRAWINGS

FIG. 1 is a plan view of a drive mechanism, according to the present invention, utilized in conjunction with a storage cell assembly according to the assembly disclosed in application Ser. No. 414,372, filed Nov. 9, 1973. Portions of an overall magnetic tape cartridge play/record mechanism is indicated diagrammatically;

FIG. 2 is a cross-sectional view taken along the line 2—2 of FIG. 1, shown on an enlarged scale;

FIG. 3 is a fragmentary bottom view of the apparatus shown in FIG. 2;

FIG. 4 is a fragmentary, cross-sectional view taken along the line 4—4 of FIG. 2, showing the actuator arm in its indexing position;

FIG. 5 is a view similar to FIG. 4, showing the actuator arm shifted to the right;

FIG. 6 is a view similar to FIG. 4, showing the actuator arm as it begins to shift to the left; and FIG. 7 is an electrical diagram showing one embodiment of circuitry utilized in conjunction with drive mechanism according to the present invention.

DESCRIPTION OF THE PREFERRED EMBODIMENTS

Referring to FIG. 1, drive mechanism, according to the present invention, is generally indicated by the reference number 10. The drive mechanism 10 is utilized to index and drive a storage cell assembly 11 having a plurality of spaced projections 12 along one side. For ease in the following description, the projections have been numbered in the various views from 1 to 10, indicating the particular tape cartridge storage cells 1–10.

Tape cartridges 13 (see FIG. 2) are positioned within the individual storage cells of the storage cell assembly 11. In this particular embodiment, an individual tape cartridge drops downwardly into a play position, indicated by the reference number 13a.

The overall play/record mechanism includes a U-shaped support channel 14 which supports the storage cell assembly 11 and a transducer head 15, which is well known in the art. Referring to FIG. 2, when the tape cartridge 13 is in the position 13a, an opening 16 in cartridge 13 receives the transducer head 15, placing the transducer head into playing engagement with a magnetic tape 17.

In this particular embodiment, a support bracket 18 mounts a solenoid or solenoid coil 19 adjacent its one end. An actuator support 20 is perpendicularly connected to the opposite end of the support bracket 18. The bracket 18 is mounted on the support channel 14 by screws 21. A guide plate 22, which defines a V-shaped recess 23, is located on the lowermost end of the actuator support 20.

In the present embodiment, a spacer bar 24 is mounted below the guide plate 22. The guide plate 22 and the spacer bar 24 define a slot 25 therebetween.

The solenoid coil 19 receives an axially movable plunger 27 having a first end 28, which is received by the solenoid coil 19, and a second bifurcated end 29, which extends outwardly of the solenoid 19. An actuator arm 30 is pivotally connected to the second end 29 of the plunger 27 by a pin 31. A compression spring 32 is positioned between the solenoid 19 and a retainer ring 33 mounted on the plunger 27 adjacent the pin 31. The spring 32 biases or urges the plunger 27 outwardly from the solenoid 19. The actuator arm 30 includes a drive end 34 having a V-shaped recess 35 which mates with the shape of the gear teeth or spaced projections 12 located on the storage cell assembly 11. The drive end 34 of the actuator arm 30 is received by the slot 25 which is defined by the guide plate 22 and the spacer bar 24.

The actuator arm 30 also includes a V-shaped female follower member 36 on its upper surface which mates with the V-shaped recess or cam recess 23 defined by the guide plate 22. The spring force from the spring 32 centers the actuator arm 30 by urging the follower member 36 into mating engagement with the V-shaped recess 23. The V-shaped recess 35 on the drive end 34 of the actuator arm 30 thereby engages an aligned projection 12 of the storage cell assembly 11 and holds it firmly into an indexing position as shown in FIG. 4. The force of the spring 32 is sufficient to accurately determine the storage cell assembly position against the frictional forces of the support channel 14.

The actuator arm 30 also mounts a direction magnet 37. The magnet 37 is fixed on the actuator arm 30 adjacent the second end 29 of the plunger 27 and thus is in a strong stray magnetic field whenever the solenoid 19 is energized. The magnet 37 attempts to align itself with the stray magnetic field. The aligning force swings the actuator arm 30 on the fulcrum pin 31 to one side or the other depending upon the polarity of the voltage applied to the solenoid 19. The polarity determines whether the exposed bifurcated portions of the end 29 of the plunger 27 are individually either a north or a south pole.

When the solenoid 19 is energized, the plunger 27 retracts into the solenoid 19 pulling the actuator arm 30 away from the mating position with the V-shaped recess 23. The actuator arm 30 is then free to move to one side or the other of the fulcrum pin 31 depending on the sense of the magnet 37 in the magnetic field. The actuator arm 30 then swings to one side or the other as indicated in FIGS. 5 and 6.

When the voltage is removed from the solenoid 19, the spring 32 forces the plunger 27 and the attached actuator arm 30 outwardly from the solenoid coil 19. The drive end 34 of the actuator arm 30 includes curved outer surfaces 38 and 39. The curved outer surfaces 38 and 39 strike one of the spaced projections 12 and forces the storage cell assembly 11 sideways in response to the expansion of the spring 32. As this action proceeds, the V-shaped recess 35 on the drive end 34 of the actuator arm 30 engages the next adjacent projection 12 of the storage cell assembly 11 and centers it into a correct indexing position when the spring 32 finally forces the actuator arm 30 to its extended position. This completes the cycle of operation and the drive mechanism 10 is ready for the next drive pulse.

Referring to FIG. 1, after the cartridge 1 is played, if the next cartridge 2 is desired, the solenoid 19 is energized, the plunger 27 retracts, and, referring to FIG. 5, the actuator arm 30 pivots to the right.

The voltage is then removed from the solenoid 19 and the spring 32 forces the curved surface 39 against the projection 1, thereby shifting the entire assembly 11 to the left. The V-shaped recess 35 on the drive end 34 of the actuator arm 30 engages the adjacent projection 2 and centers it into a correct indexing position. If number 5 is desired rather than number 2, the mechanism 10 continues the above operation in a stepping manner until number 5 is reached.

If, after number 2 is played, it is desired to again play number 1, the solenoid 19 is energized under a reversed polarity and as the plunger 27 retracts, the arm 30 pivots to the left, as shown in FIG. 6. In this event, when the voltage is removed, the spring 32 forces the curved surface 38 against the projection 2, thereby shifting the entire storage cell assembly to the right. The V-shaped recess 35 engages the projection 1 and centers it into a correct indexing position, shown in FIG. 1.

FIG. 7 illustrates one embodiment of electrical circuitry utilized in operating the drive mechanism 10 in the manner described above. The logic, which determines the direction in which the storage cell assembly 11 is to be moved, applies a positive voltage to one of a pair of input terminals 101 and 102. Both of the input terminals 101 and 102 are held at approximately ground potential until movement of the storage cell assembly 11 is desired. The positive potential at the input terminal 101 causes a transistor 103 to conduct. In the alternative, a positive potential at the input terminal 102 causes a transistor 104 to conduct.

The conduction of transistor 103 causes transistors 105 and 106 to conduct, thereby applying the supply voltage at power supply terminals 107 and 108 to appear across the coil of the positioning solenoid 19. This initiates the desired mechanical action described above. When the transistors 103, 105 and 106 are conducting, the storage cell assembly 11 is moved to the next higher numbered cell position.

On the other hand, when the positive potential is applied to input terminal 102, transistor 104 conducts. This in turn causes transistors 109 and 110 to conduct, applying the supply voltage at terminals 107 and 108 to appear across the coil of the positioning solenoid 19. In this event, the storage cell assembly 11 is moved to the next lower numbered cell position.

When the positive control voltage is applied at input terminal 101, the transistor 103 is driven into saturation and junction points 112 and 113 assume essentially the same potential, which is above ground (supply terminal 108), by the amount of the emitter-base drop across the transistor 106. This is usually somewhat less than one volt. The current which flows in the emitter-base junction of the transistor 106 and also the emitter-base junction of the transistor 105 also flows through the transistor 103 and is limited in magnitude by a resistor 115. The resistor 115 is selected such that the base currents in transistors 105 and 106 are sufficiently high for the transistors to be in saturation at the current which will flow in the coil of the positioning solenoid 19 when the full supply voltage from the supply terminals 107 and 108 appears across it. The positive supply potential at terminal 107 thus appears at the junction of the coil of the positioning solenoid 19 and the collector of the transistor 105. The ground potential also appears at the junction of the coil of the positioning solenoid 19 and the collector of the transistor 106. This causes the actuator arm 30 to be drawn back by the plunger 27 and the magnet 37 finds itself in the stray magnetic field such that the actuator arm 30 pivots to the right as shown in FIG. 5. Zener diodes 116 and 117 are connected in opposing polarities and are of such a voltage rating that they do not conduct when the actuating voltage in either polarity is applied across the coil of the positioning solenoid 19.

The voltage across the coil of the positioning solenoid 19 is removed when the positive voltage at the input terminal 101 is removed. When this occurs, the base of the transistor 103 is pulled to ground by the logic driving the circuit. Transistor 103 is turned off. With the transistor 103 in the non-conducting condition, the emitter and base of transistor 105 will be at the positive supply potential which is at the terminal 107. The emitter and base of the transistor 106 will be at ground potential (terminal 108). Both transistors 105 and 106 will then become non-conducting. This removes the supply potential from across the coil of the positioning solenoid 19. The energy stored in the magnetic field of the coil of the positioning solenoid 19 causes the generation of a voltage higher than the supply voltage to appear across the coil of the positioning solenoid 19 in such a sense as to tend to keep the current flowing. In order to prevent this voltage buildup from reaching a level which might damage any of the transistors 105, 106, 109 or 110, the zener diodes 116 and 117 seek a voltage across them which is sufficient to cause them to conduct. The energy stored in the coil of the positioning solenoid 19 is thus dissipated in the zener diodes 116 and 117, which prevents transistor damage.

The removal of the voltage from across the coil of the positioning solenoid 19 allows the spring 32 to force the plunger 27 out of the solenoid 19 and forces the curved surface 39 against the projection 1, thereby shifting the entire assembly 11 to the left.

When the logic applies the positive control voltage to the terminal 102, the other half of the above-described circuit operates in a similar manner as described above with respect to when the positive control voltage is applied to the terminal 101.

What we claim is:

1. Drive mechanism for selectively driving a storage assembly having a plurality of spaced drive projections, comprising, a solenoid, a plunger having first and second ends, said first end of said plunger positioned within said solenoid and said second end extending outwardly of said solenoid, biasing means for urging said second end of said plunger outwardly of said solenoid, an actuator arm pivotally attached adjacent said second end of said plunger, said actuator arm having a drive end for engaging such drive projections and magnetic means on said actuator arm adjacent said second end of said plunger.

2. Drive mechanism, according to claim 1, wherein said drive end of said actuator arm has a shaped recess for mating with one of such spaced drive projections.

3. Drive mechanism, according to claim 1, including support means for mounting said solenoid.

4. Drive mechanism, according to claim 1, wherein said biasing means comprises a spring surrounding said plunger.

5. Drive mechanism, according to claim 3, wherein said support means includes a bracket having a platform for mounting said solenoid and an actuator support mounted on said bracket.

6. Drive mechanism, according to claim 5, including actuator arm guide means for aligning said drive end of said actuator arm with one of such spaced drive projections, said guide means including a guide plate on said actuator support, said guide plate defining a V-shaped guide recess, said actuator arm having a V-shaped follower member on its surface, said follower member being complementary with such V-shaped guide recess.

7. Drive mechanism, according to claim 6, including a spacer bar mounted adjacent said guide plate, said spacer bar and said guide plate defining a slot therebetween for receiving said drive end of said actuator arm.

8. Drive mechanism for selectively driving a storage assembly having a plurality of spaced drive projections, comprising, a support member having an actuator support mounted at one end, a guide plate mounted on said actuator support, said guide plate defining a V-shaped guide recess, a solenoid mounted on said support member, a plunger having first and second ends, said first end of said plunger positioned within said solenoid, a spring surrounding said plunger and positioned between said solenoid and said second end of said plunger for urging said plunger outwardly relative to said solenoid, an actuator arm pivotally attached adjacent said second end of said plunger, said actuator arm having a drive end for engaging such drive projections and a follower member complementary with such V-shaped guide recess and magnet means on said actuator arm adjacent said second end of said plunger.

* * * * *